(12) United States Patent
Saruwatari

(10) Patent No.: US 8,976,228 B2
(45) Date of Patent: Mar. 10, 2015

(54) ZOOM LENS AND IMAGE PICKUP APPARATUS EQUIPPED WITH SAME

(71) Applicant: Canon Kabushiki Kaisha, Tokyo (JP)

(72) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/734,819

(22) Filed: Jan. 4, 2013

(65) Prior Publication Data

US 2013/0176385 A1 Jul. 11, 2013

(30) Foreign Application Priority Data

Jan. 6, 2012 (JP) ................................. 2012-001061

(51) Int. Cl.
*H04N 5/262* (2006.01)
*G03B 7/00* (2014.01)
*H04N 5/235* (2006.01)
*G02B 15/14* (2006.01)
*G02B 15/173* (2006.01)

(52) U.S. Cl.
CPC .............. *G02B 15/14* (2013.01); *G02B 15/173* (2013.01)
USPC ...................... 348/36; 348/240.3; 348/240.99; 348/240.1; 348/362; 359/676; 359/689; 359/680

(58) Field of Classification Search
USPC ...................................................... 348/30–50
See application file for complete search history.

(56) References Cited

U.S. PATENT DOCUMENTS

| | | | |
|---|---|---|---|
| 4,657,351 A | 4/1987 | Mori | |
| 5,235,466 A * | 8/1993 | Ono et al. ..................... | 359/684 |
| 6,992,835 B2 * | 1/2006 | Iwasawa et al. .............. | 359/682 |
| 7,209,296 B2 * | 4/2007 | Mihara et al. ................. | 359/676 |
| 7,375,899 B2 * | 5/2008 | Kuo .............................. | 359/676 |
| 7,426,080 B2 * | 9/2008 | Sugita ........................... | 359/676 |
| 7,433,131 B2 * | 10/2008 | Iwasawa ....................... | 359/683 |
| 7,466,494 B2 * | 12/2008 | Kuo .............................. | 359/680 |
| 7,505,212 B2 * | 3/2009 | Omichi ......................... | 359/683 |
| 7,557,839 B2 * | 7/2009 | Ohashi ....................... | 348/240.3 |
| 7,652,688 B2 * | 1/2010 | Kuroda .................... | 348/208.11 |
| 8,526,118 B2 * | 9/2013 | Miyatani et al. ............. | 359/684 |
| 8,792,183 B2 * | 7/2014 | Chou ............................ | 359/689 |
| 2002/0118966 A1 * | 8/2002 | Hofer et al. .................... | 396/79 |
| 2012/0026600 A1 * | 2/2012 | Matsumura ................... | 359/676 |

FOREIGN PATENT DOCUMENTS

JP 2006171431 A 6/2006

\* cited by examiner

*Primary Examiner* — Joseph Ustaris
*Assistant Examiner* — Talha Nawaz
(74) *Attorney, Agent, or Firm* — Canon USA Inc. IP Division

(57) ABSTRACT

A zoom lens includes, in order from an object side to an image side, a positive first lens unit, a negative second lens unit, a positive third lens unit, and a positive fourth lens unit. During zooming from a wide-angle end to a telephoto end, the first lens unit moves with a locus convex toward the image side, and the third lens unit moves toward the object side. The first lens unit includes, in order from the object side to the image side, a negative first lens, a positive second lens, and a positive third lens. A distance ($d_{12}$) between the first lens and the second lens, a focal length (fw) of the entire zoom lens at the wide-angle end, and a refractive index (Np) of a positive lens having the lowest refractive index among the refractive indices of materials of all positive lenses included in the first lens unit are appropriately set based on predetermined mathematical conditions.

10 Claims, 13 Drawing Sheets

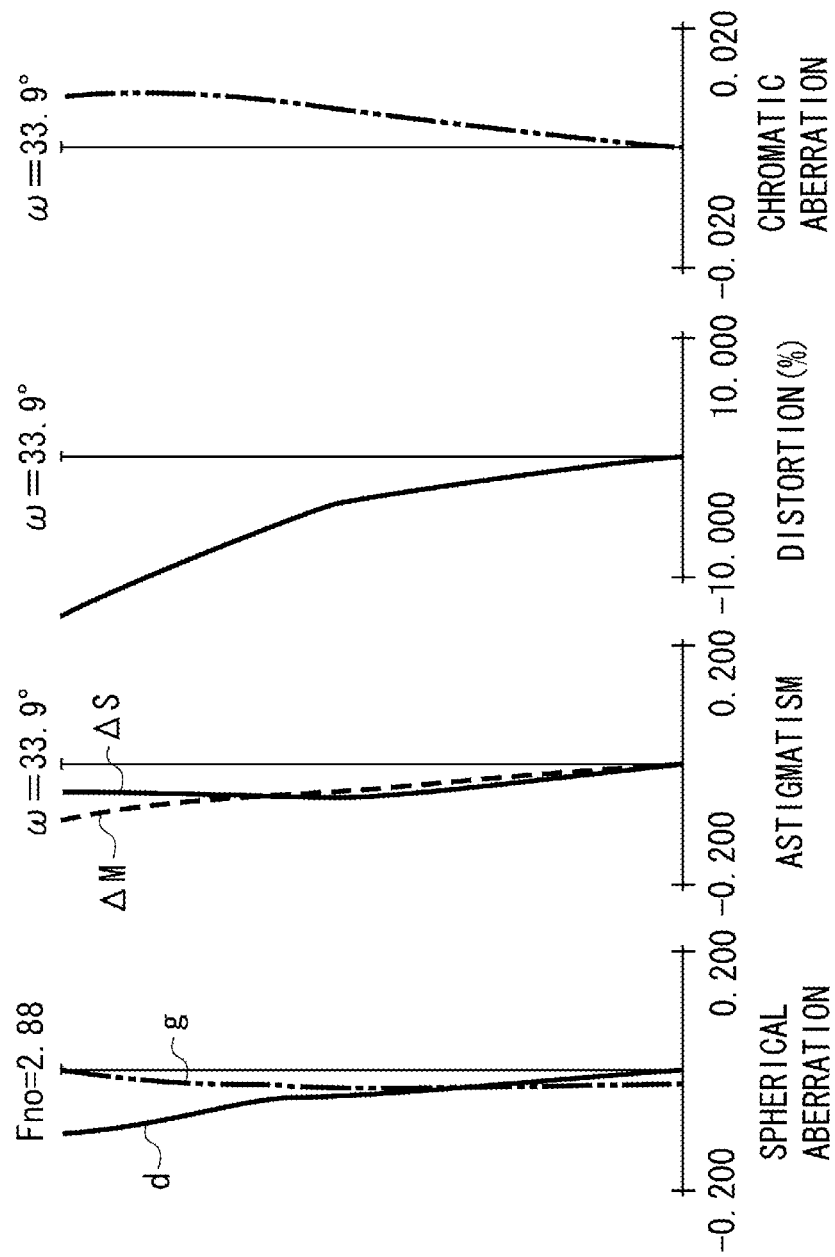

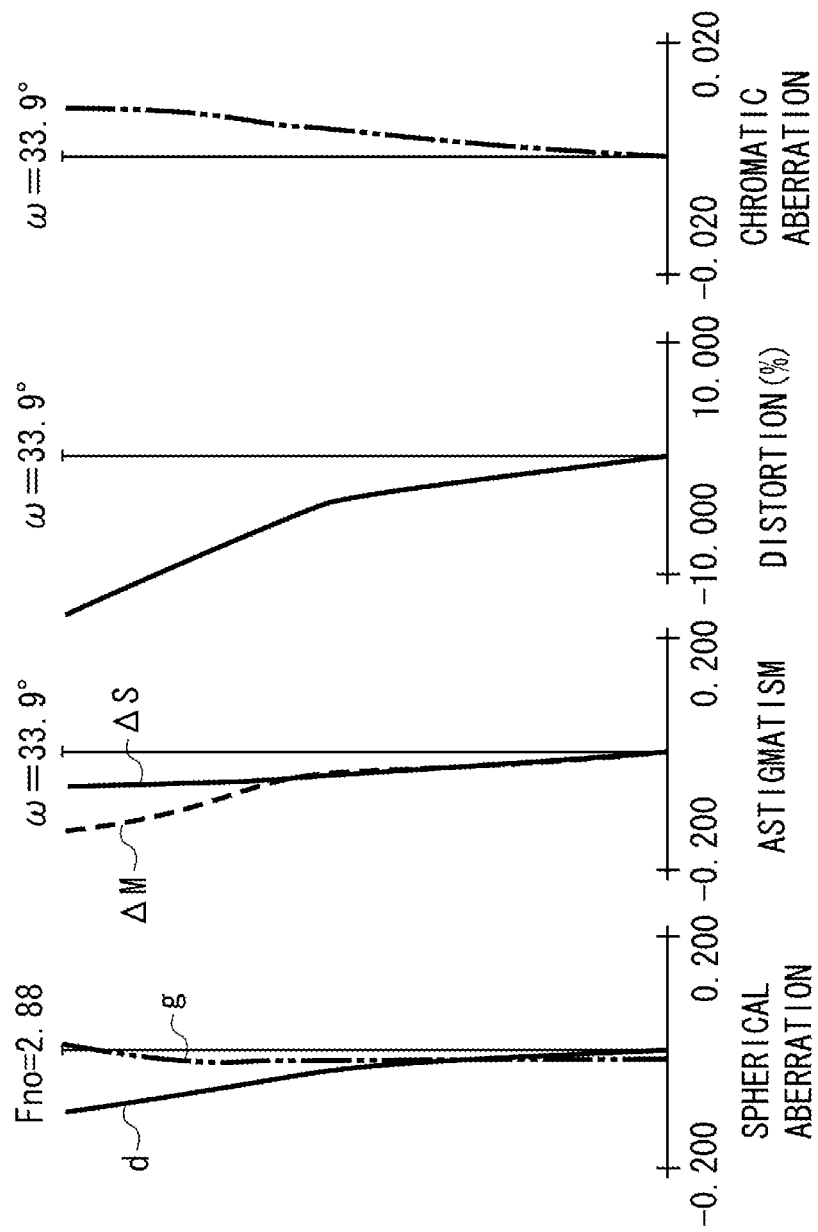

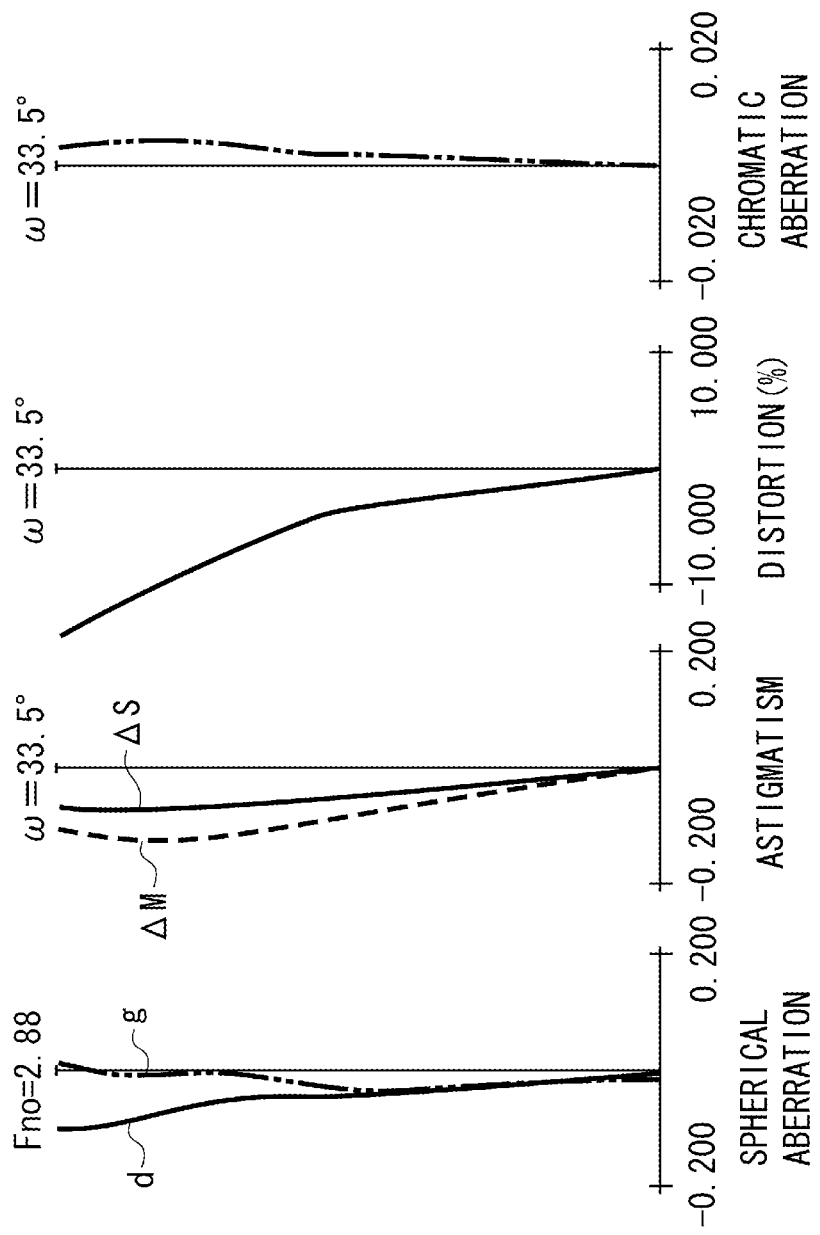

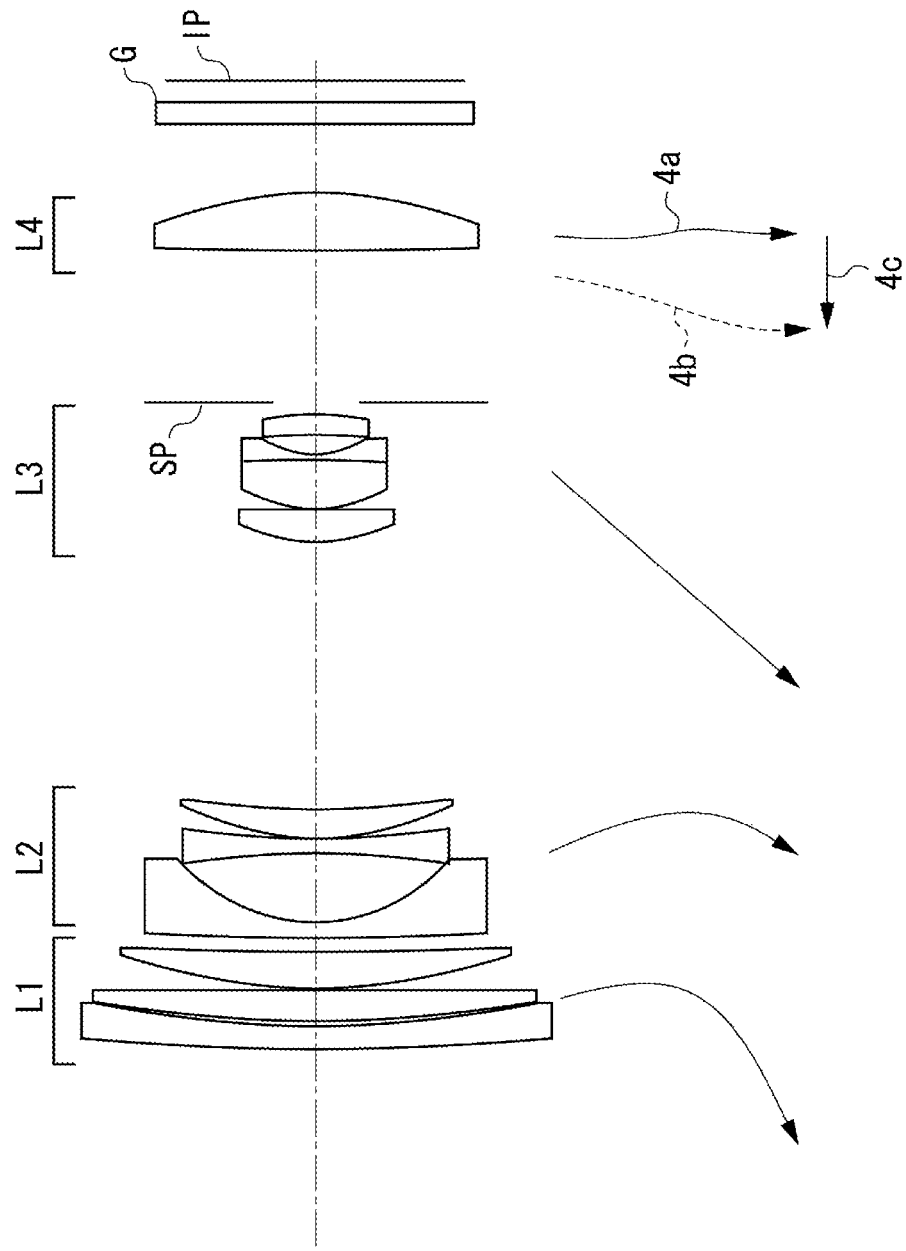

ZOOM LENS AND IMAGE PICKUP APPARATUS EQUIPPED WITH SAME

BACKGROUND OF THE INVENTION

1. Field of the Invention

The present invention relates to a zoom lens and an image pickup apparatus equipped with a zoom lens; these may be suitable for a photographic optical system used in an image pickup apparatus, such as a video camera, an electronic still camera, a monitoring camera, a TV camera, and a silver-halide film camera.

2. Description of the Related Art

As the size of imaging apparatuses continues to decrease, a photographic optical system used for an image pickup apparatus is required to be equipped with a zoom lens that has short total lens length, small size, wide angle of view, high resolution, and high zoom ratio, among other significant characteristics.

In order to realize a high zoom ratio in a zoom lens, a positive-lead type zoom lens configuration is advantageous. In the positive-lead type lens configuration, a lens unit having positive refractive power is located at a position closest to the object to be imaged (i.e., at the object side of the zoom lens).

A four-unit zoom lens is known. The four-unit zoom lens includes, in order from an object side to an image side, a first lens unit having positive refractive power, a second lens unit having negative refractive power, a third lens unit having positive refractive power, and a fourth lens unit having positive refractive power.

There is known a high-zoom-ratio zoom lens that performs zooming by moving all of the lens units of a four-unit zoom lens. U.S. Pat. No. 4,657,351 discusses a zoom lens that achieves compactness of the entire zoom lens by appropriately setting a focal length (reciprocal of refractive power) of each lens unit and appropriately defining a moving locus of a second lens unit during zooming.

Also, there is known a compact zoom lens that performs zooming by moving two lens units of a four-unit zoom lens. Japanese Patent Application Laid-Open No. 2006-171431 discusses a rear-focus type zoom lens that performs focusing while moving a second lens unit to perform variable magnification and moving a fourth lens unit to correct a variation on an image plane caused by variable magnification. In addition, an increase in an effective diameter of a front lens is reduced by using a high-refractive-index material in lenses constituting a first lens unit.

In order to realize a zoom lens having a wide angle of view, a high zoom ratio, and a small size in the entire zoom lens, the number of lenses is reduced while reinforcing refractive power of each lens unit constituting the zoom lens. However, if the refractive power of each lens surface is increased, a lens thickness is increased and various aberrations are increased. As a result, it is difficult to correct various aberrations.

Also, if it is intended to retract and store each lens unit when a camera is not in use, an influence of possible tilt of lenses and lens units may increase in terms of a mechanism structure. In this case, if the sensitivity to decentering of lenses and lens units is high, optical performance degrades and an image shake occurs during zooming, resulting in image degradation. Therefore, in the zoom lens, it is desirable to reduce the sensitivity to decentering of lenses or lens units as much as possible.

In a method of performing variable magnification (zooming) by moving only a second lens unit and a fourth lens unit of a four-unit zoom lens, most variable magnification is performed by the second lens unit. For this reason, it is customary to increase the refractive powers of the first and second lens units. However, when the refractive power of the second lens unit is increased, aberration variation tends to increase during zooming.

On the other hand, a method of moving all of the four lens units is suitable for a retractable structure because refractive power of a first lens unit or a second lens unit is reduced and sensitivity to decentering from an optical axis is reduced. In addition, when moving all of the four lens units, it is easy to reduce aberration variation during zooming. However, if it is intended to downsize the entire zoom lens while achieving a wider angle of view and a higher zoom ratio, various aberrations increase in a middle zoom area of the entire zoom range. Therefore, it is difficult to correct these aberrations.

In the zoom lens discussed in U.S. Pat. No. 4,657,351, the number of lenses of each lens unit is increased so as to obtain a desired optical performance. Therefore, even when a lens barrel is provided with a retractable structure, it is difficult to reduce a total lens length. The zoom lens discussed in Japanese Patent Application Laid-Open No. 2006-171431 achieves downsizing of the entire zoom lens while achieving a high zoom ratio. However, since principal variable magnification depends on the second lens unit, aberration variation tends to increase during zooming.

In order to achieve downsizing of the entire zoom lens, a wide angle of view, and a high zoom ratio and obtain high optical performance over an entire zoom range, it is important to appropriate set the lens configuration of each lens unit. In the four-unit zoom lens described above, in particular, it is important to appropriate set the lens configuration of the first lens unit and an amount of movement of the first lens unit according to zooming. If these configurations are not appropriately set, it is very difficult to achieve downsizing of the entire zoom lens, a wide angle of view, and a high zoom ratio and obtain high optical performance over an entire zoom range.

SUMMARY OF THE INVENTION

The present invention is directed to a zoom lens, which has a wide angle of view, a high zoom ratio, and high optical performance over an entire zoom range, and is compact in the entire zoom lens, and an image pickup apparatus including the zoom lens.

According to one aspect of the present invention, a zoom lens includes, in order from an object side to an image side, a first lens unit having positive refractive power, a second lens unit having negative refractive power, a third lens unit having positive refractive power, and a fourth lens unit having positive refractive power, wherein, during zooming from a wide-angle end to a telephoto end, the first lens unit moves with a locus convex toward the image side, and the third lens unit moves toward the object side, wherein the first lens unit includes, in order from the object side to the image side, a first lens having negative refractive power, a second lens having positive refractive power, and a third lens having positive refractive power, and wherein the following conditions are satisfied:

$$0.005 < d_{12}/fw < 0.050$$

$$1.67 < Np < 2.02$$

where $d_{12}$ is a distance between the first lens and the second lens, fw is a focal length of the entire zoom lens at the wide-angle end, and Np is the refractive index of a positive lens having the lowest refractive index among the refractive indices of materials of all positive lenses included in the first lens unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B are aberration diagrams of the zoom lens at the wide-angle end and the telephoto end, respectively, according to the first exemplary embodiment.

FIGS. 4A and 4B are aberration diagrams of the zoom lens at the wide-angle end and the telephoto end, respectively, according to the second exemplary embodiment.

FIGS. 6A and 6B are aberration diagrams of the zoom lens at the wide-angle end and the telephoto end, respectively, according to the third exemplary embodiment.

FIG. 7 is a lens sectional view of a zoom lens at the wide-angle end according to a fourth exemplary embodiment of the present invention.

DESCRIPTION OF THE EMBODIMENTS

Various exemplary embodiments, features, and aspects of the invention will be described in detail below with reference to the drawings.

A zoom lens according to an exemplary embodiment of the present invention includes, in order from an object side to an image side, a first lens unit having positive refractive power, a second lens unit having negative refractive power, a third lens unit having positive refractive power, and a fourth lens unit having positive refractive power. During zooming from a wide-angle end to a telephoto end, the first and second lens units move with a locus convex toward the image side, and the third lens unit moves toward the object side. Also, the fourth lens unit also moves nonlinearly.

Figure 1:
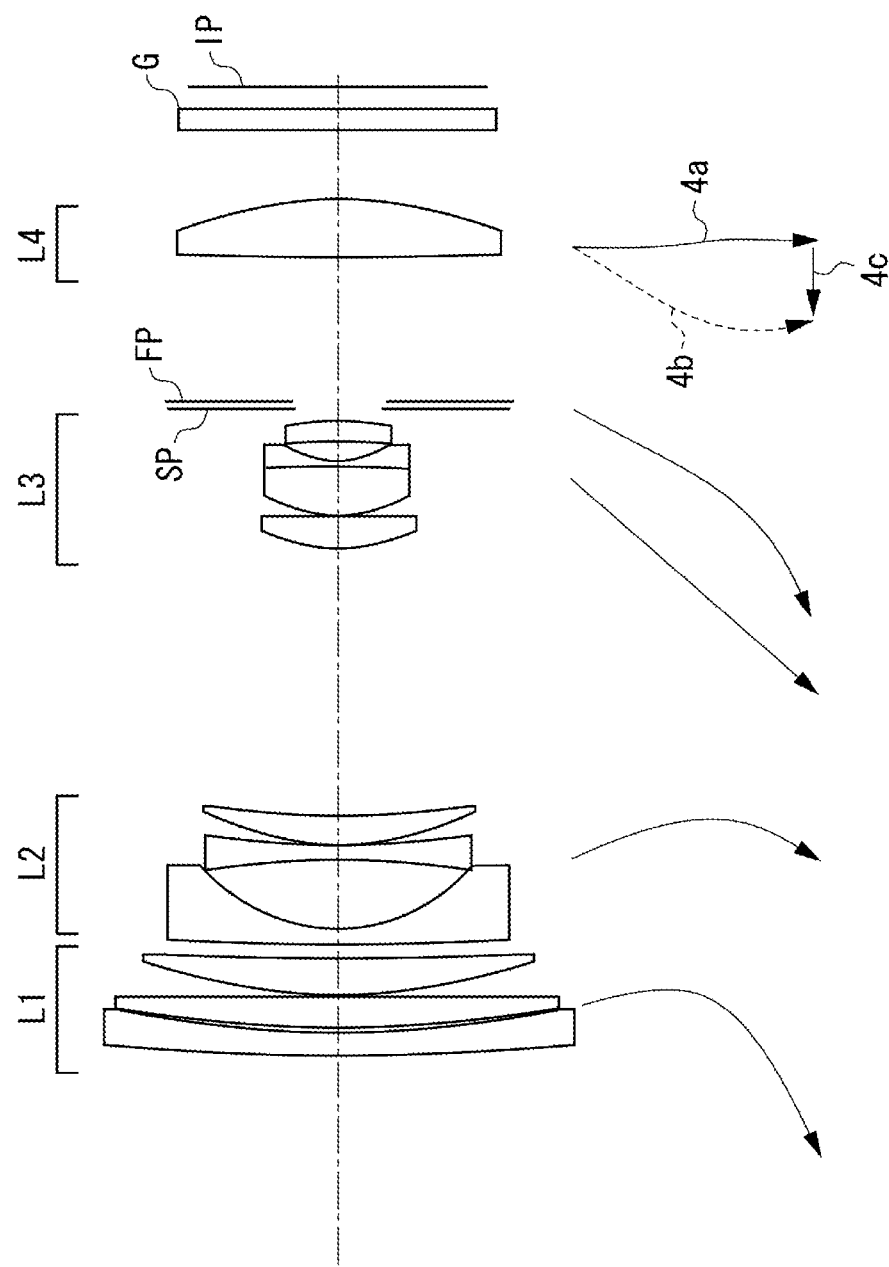
FIG. 1 is a lens sectional view of a zoom lens at the wide-angle end according to a first exemplary embodiment of the present invention.
Figure 2B:
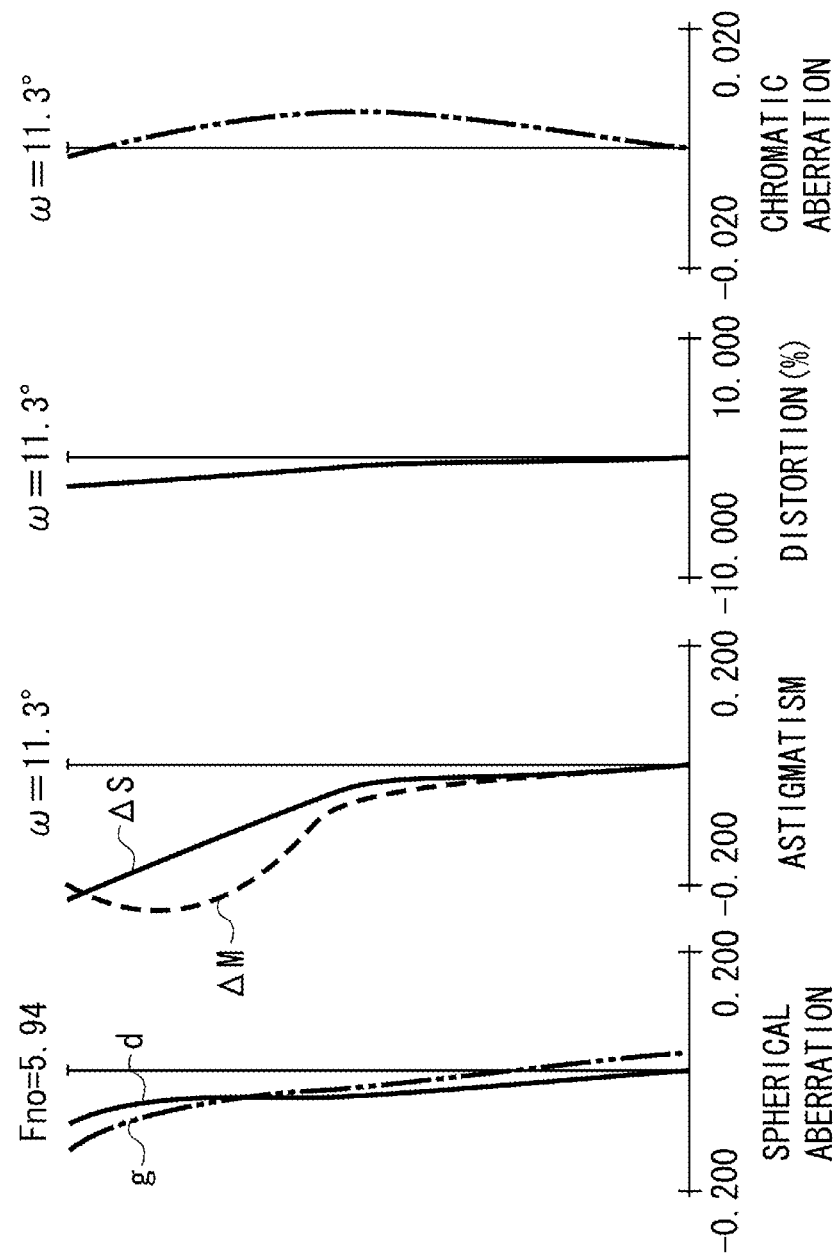
Figure 3:
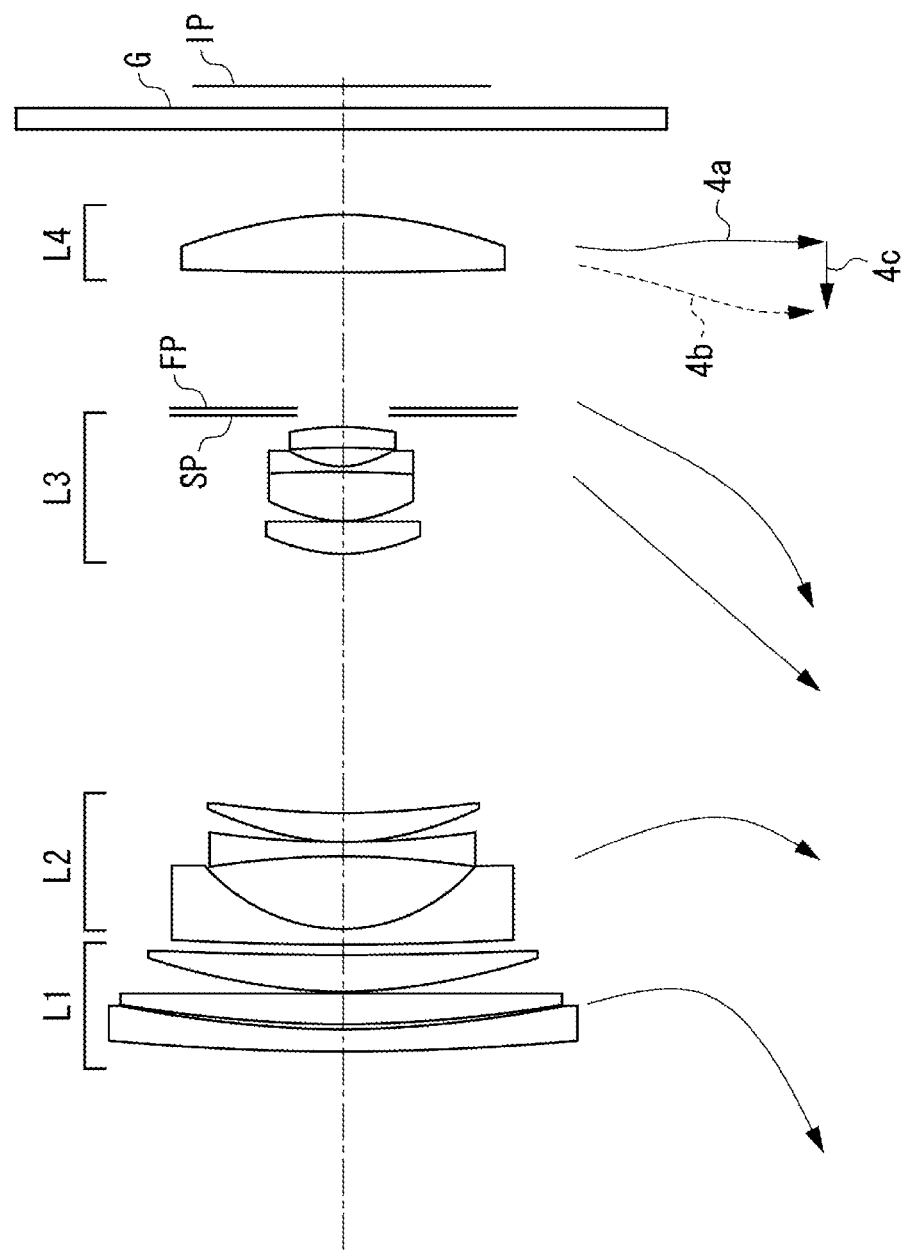
FIG. 3 is a lens sectional view of a zoom lens at the wide-angle end according to a second exemplary embodiment of the present invention.
Figure 4B:
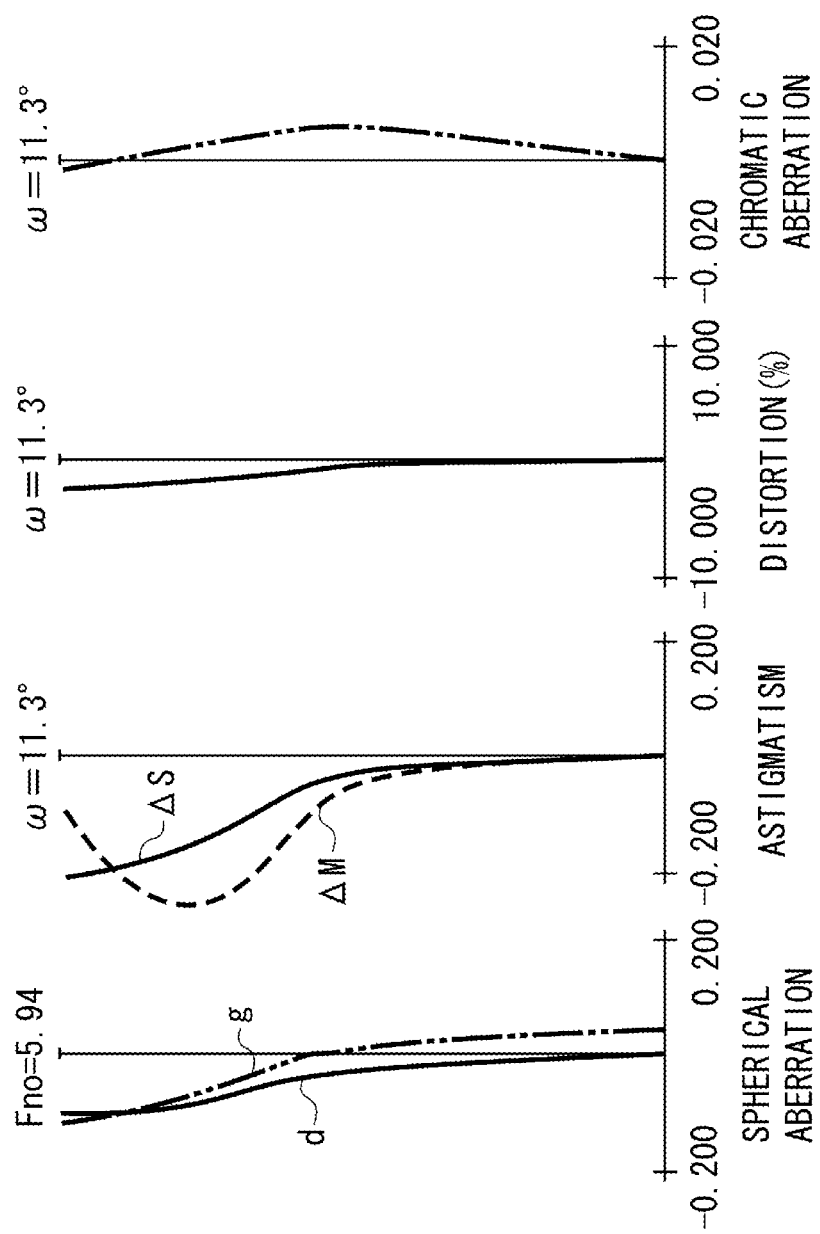
Figure 5:
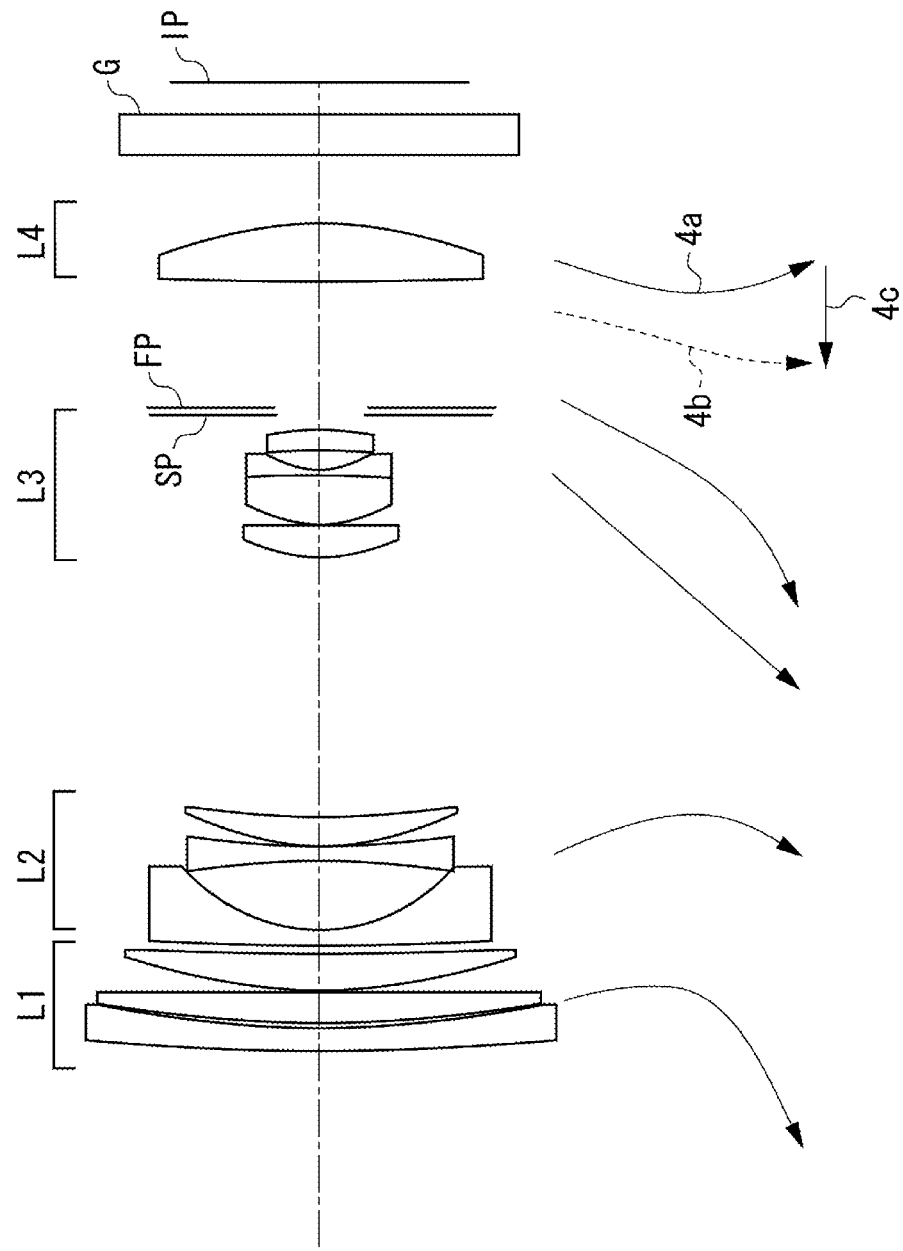
FIG. 5 is a lens sectional view of a zoom lens at the wide-angle end according to a third exemplary embodiment of the present invention.
Figure 6B:
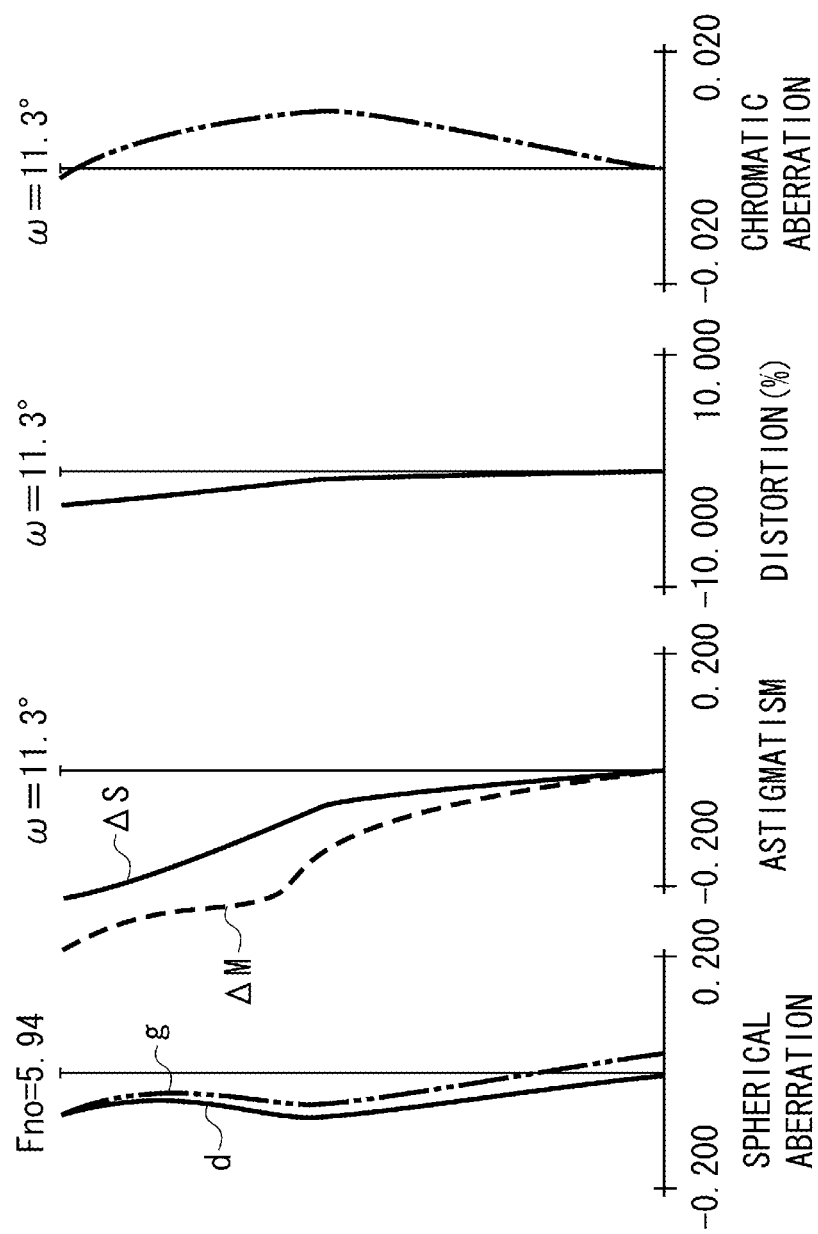

FIG. 1 is a lens sectional view of a zoom lens at the wide-angle end (short focal length) according to a first exemplary embodiment of the present invention, and FIGS. 2A and 2B are aberration diagrams of the zoom lens at the wide-angle end and the telephoto end (long focal length end), respectively, according to the first exemplary embodiment. FIG. 3 is a lens sectional view of a zoom lens at the wide-angle end according to a second exemplary embodiment of the present invention, and FIGS. 4A and 4B are aberration diagrams of the zoom lens at the wide-angle end and the telephoto end, respectively, according to the second exemplary embodiment. FIG. 5 is a lens sectional view of a zoom lens at the wide-angle end according to a third exemplary embodiment of the present invention, and FIGS. 6A and 6B are aberration diagrams of the zoom lens at the wide-angle end and the telephoto end, respectively, according to the third exemplary embodiment.

Figure 8A:
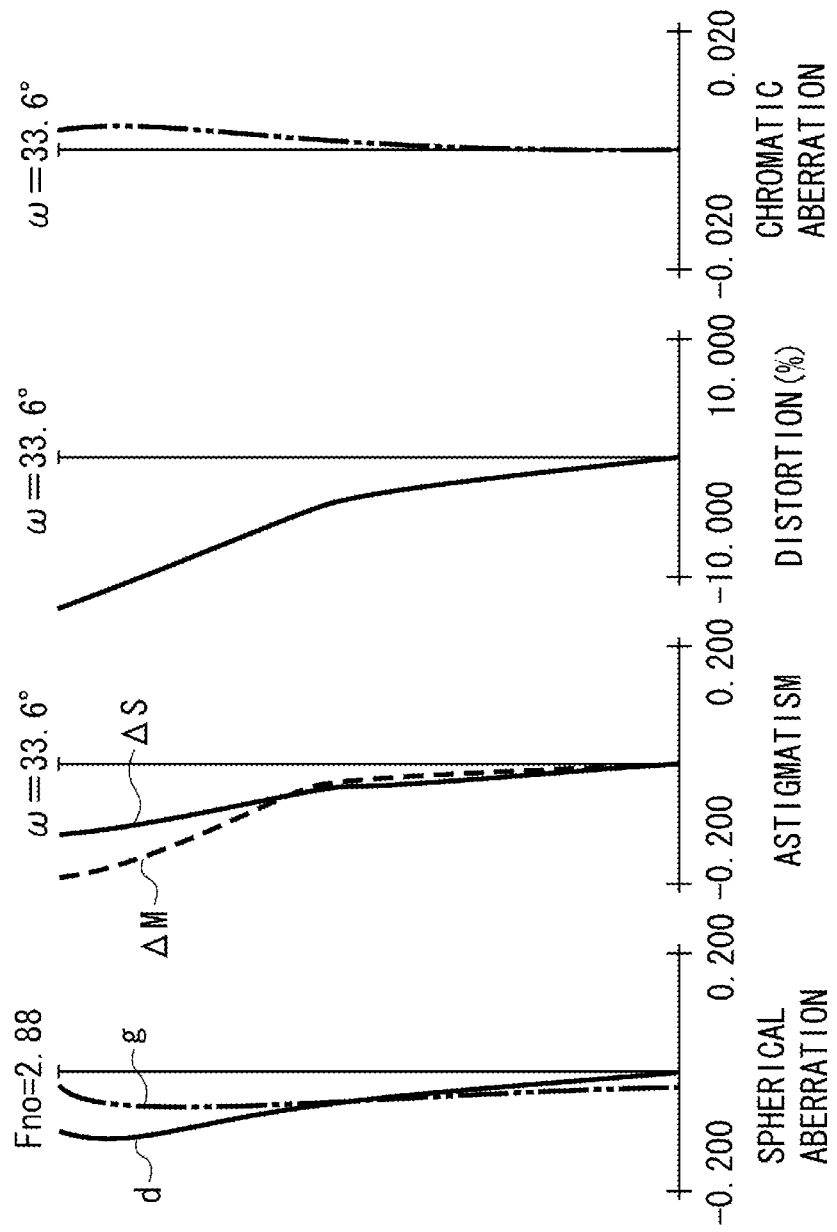
FIGS. 8A and 8B are aberration diagrams of the zoom lens at the wide-angle end and the telephoto end, respectively, according to the fourth exemplary embodiment.
Figure 8B:
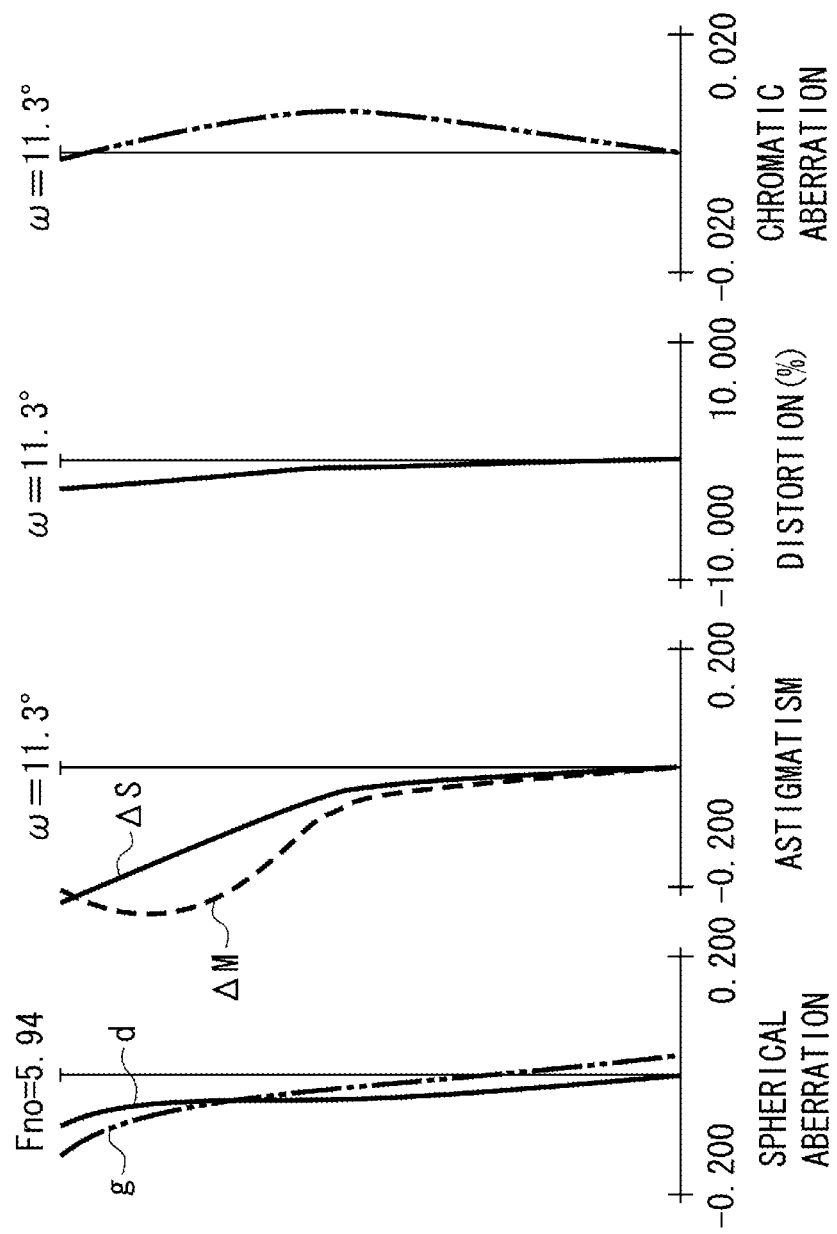
Figure 9:
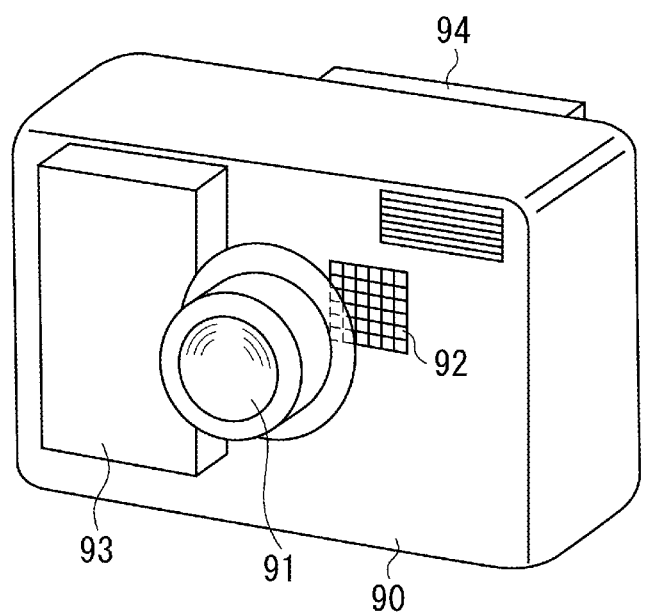
FIG. 9 is a schematic diagram illustrating relevant portions of an image pickup apparatus according to an exemplary embodiment of the present invention.

FIG. 7 is a lens sectional view of a zoom lens at the wide-angle end according to a fourth exemplary embodiment of the present invention, and FIGS. 8A and 8B are aberration diagrams of the zoom lens at the wide-angle end and the telephoto end, respectively, according to the fourth exemplary embodiment. FIG. 9 is a schematic diagram illustrating principal portions of a camera (image pickup apparatus) including the zoom lens according to the exemplary embodiment. In each lens sectional view, the left side is the object side (front side), and the right side is the image side (rear side). Also, i denotes an order of a lens unit from the object side, and Li denotes an i-th lens unit.

In each lens sectional view, a first lens unit L1 has positive refractive power (optical power=reciprocal of focal length), a second lens unit L2 has negative refractive power, a third lens unit L3 has positive refractive power, and a fourth lens unit L4 has positive refractive power. An aperture stop SP is located on the image side of the third lens unit L3. A flare-cut stop FP is located on the image side of the aperture stop SP. G denotes an optical block, such as an optical filter, a faceplate, a crystal low-pass filter, and an infrared cutoff filter.

IP denotes an image plane. When the zoom lens is used as a photographic optical system of a video camera or a digital still camera, a photosensitive surface corresponding to an imaging surface of a solid-state image sensor (photoelectric conversion element), such as a charge-coupled device (CCD) sensor or a complementary metal-oxide semiconductor (CMOS) sensor, is placed on the image plane IP. When the zoom lens is used in a silver-halide film camera, a photosensitive surface corresponding to a film surface is placed on the image plane IP. In each aberration diagram, d and g denote d-line and g-line, respectively, and ΔM and ΔS denote a meridional image plane and a sagittal image plane, respectively. Chromatic aberration of magnification is denoted by g-line. ω denotes a half angle of view, and Fno denotes an F-number. Also, in each of the following exemplary embodiments, the wide-angle end and the telephoto end refer to zoom positions when a lens unit for variable magnification is positioned at each of the ends of a range in which the lens unit for variable magnification is mechanically movable along an optical axis.

In each exemplary embodiment, during zooming from the wide-angle end to the telephoto end, each lens unit moves as indicated by an arrow. Specifically, in each exemplary embodiment, during zooming from the wide-angle end to the telephoto end, the first lens unit L1 moves with a locus convex toward the image side as indicated by the arrow of each drawing. Also, the second lens unit L2 moves with a locus convex toward the image side. In addition, the third lens unit L3 moves toward the object side, and the fourth lens unit L4 moves nonlinearly.

By moving the first lens unit L1 toward the image side during zooming from the wide-angle end to the telephoto end, a distance of entrance pupil near the wide-angle end is shortened. Therefore, the incidence height of an off-axis light beam is suppressed, and the effective diameter of the front lens is reduced. By moving the second lens unit L2 with a locus convex toward the image side, a space in which the third lens unit L3 near the telephoto end moves toward the object side is secured, and variable magnification contribution of the third lens unit L3 is increased.

During zooming, the first lens unit L1 and the third lens unit L3 at the telephoto end rather than the wide-angle end move such that the first lens unit L1 and the third lens unit L3 are positioned on the object side. Therefore, it is possible to obtain a high zoom ratio, while shortening the total lens length at the wide-angle end. In particular, in each exemplary embodiment, by moving the third lens unit L3 toward the object side during zooming from the wide-angle end to the telephoto end, variable magnification is shared by the third lens unit L3 and the fourth lens unit L4. In addition, the second lens unit L2 is made to have a great variable magnification effect by moving the first lens unit L1 having positive refractive power at the telephoto end rather than the wide-angle end such that the first lens unit L1 is positioned on the object side.

Therefore, a high zoom ratio can be obtained, without excessively increasing the refractive powers of the first lens unit L1 and the second lens unit L2. Also, in each exemplary embodiment, a rear focus method is employed to perform focusing by moving the fourth lens unit L4 on an optical axis.

When performing focusing from the infinitely-distant object to the short-distance object at the telephoto end, the fourth lens unit L4 moves forward as indicated by an arrow 4c in each lens sectional view. A solid-line curve 4a and a dotted-line curve 4b for the fourth lens unit L4 represent a moving locus for correcting a variation on the image plane according to zooming from the wide-angle end to the telephoto end when focusing on an infinitely-distant object and a short-distance object, respectively. In each exemplary embodiment, a rapid focusing can be performed by moving a lightweight fourth lens unit L4 for the purpose of focusing. For example, automatic focus detection is facilitated.

In each exemplary embodiment, an image forming position is changed in a direction perpendicular to the optical axis by moving the third lens unit L3 in a direction having a component of a direction perpendicular to the optical axis. That is, an image shake caused by the vibration of the zoom lens is corrected. Image stabilization is performed without adding a new optical member, such as a variable angle prism, or a new image-stabilization lens unit. Therefore, an increase in the total size of the zoom lens is prevented.

The lens unit moving in a direction having a component of a direction perpendicular to the optical axis so as to correct an image shake is not limited to the third lens unit L3. In each exemplary embodiment, since the aperture stop SP is located near the third lens unit L3, the lens outside diameter of the third lens unit L3 becomes small. Therefore, in terms of the driving weight, the use of the third lens unit L3 is useful to the use of other lens units.

Also, in each exemplary embodiment, the aperture stop SP moves integrally with the third lens unit L3 during zooming. Therefore, the effective diameter of the front lens is reduced by arranging the entrance pupil position to be maximally close to the object side at the wide-angle end area.

However, the aperture stop SP may move separately from the third lens unit L3 (with a different moving locus). If the third lens unit L3 and the aperture stop SP integrally move, the number of units divided into moving/movable units is reduced. Therefore, it is easy to simplify a mechanism structure. Also, when the aperture stop SP is set to be stationary, a stop unit need not be moved. Therefore, during zooming, a driving torque of an actuator to be driven can be set to a low level. As a result, it is advantageous in terms of energy saving.

The flare-cut stop FP located at the image plane of the aperture stop partially blocks unnecessary light of off-axis light beam. In the first to third exemplary embodiments, during zooming, the flare-cut stop FP moves with a locus different from that of the third lens unit L3. Since off-axis flare light is blocked in the middle zoom area, superior optical performance is obtained.

In each exemplary embodiment, the first lens unit L1 includes, in order from the object side to the image side, a first lens having negative refractive power, a second lens having positive refractive power, and a third lens having positive refractive power. A distance between the first lens and the second lens is denoted by $d_{12}$, and a focal length of the entire zoom lens at the wide-angle end is denoted by fw. Notably, the refractive index of the second and third lenses having positive refractive power (positive lenses) is desirably set appropriately. The refractive index of the material of the positive lens having the lowest refractive index among the refractive indices of materials of the positive lenses included in the first lens unit L1 is denoted by Np. In this case, the following conditions are satisfied:

$$0.005 < d_{12}/fw < 0.050 \quad (1)$$

$$1.67 < Np < 2.02 \quad (2)$$

An issue occurring when the zoom lens is made to have a wide angle of view and a high zoom ratio is a variation of coma in a middle area (middle zoom area) during zooming. As a countermeasure, it is common to increase the number of constituent lenses of the lens unit having high refractive power, or employ aspheric surfaces. However, if the number of the constituent lenses is increased, the size of the entire zoom lens is increased. Also, the use of many aspheric surfaces is difficult in terms of manufacturing.

In each exemplary embodiment, the first lens unit L1 is provided with three independent lenses, including, in order from the object side to the image side, a first lens having negative refractive power, a second lens having positive refractive power, and a third lens having positive refractive power. The first lens having negative refractive power, which is closest to the object side, serves to greatly bend off-axis light beam. Since air layer is provided between the first lens and the second lens having positive refractive power, which is located on the image side, the refractive power of the first lens having negative refractive power is shared. Therefore, aberration correction is excellently performed.

The condition (1) relates to a distance between the first lens having negative refractive power and the second lens having positive refractive power in the first lens unit L1. The distance aims to share the negative refractive power as described above. Therefore, if the distance is small enough to exceed the lower limit of the condition (1), the contribution of the negative refractive power is reduced. If intending to achieve a wide angle of view of the zoom lens under this condition, it is necessary to increase the refractive power of the first lens having negative refractive power.

As a result, a variation in curvature of field increases during zooming. If the upper limit of the condition (1) is exceeded, the distance is increased, which is advantageous to a wide angle of view. However, on-axis thickness occupied by the first lens unit L1 is increased, it is difficult to reduce the total lens length when retracted. Also, if the first lens having negative refractive power and the second lens having positive refractive lens are too far apart, axial chromatic aberration and chromatic aberration of magnification greatly occur from both of the lenses. Therefore, it is difficult to obtain a high zoom ratio.

The condition (2) relates to refractive indices of materials of all positive lenses constituting the first lens unit L1. As is generally known, in the case of the positive lenses having the same refractive powers, the curvature of the lens surface can be loosened by using a material having high refractive index. Therefore, it is easy to make a single lens thin. If the thickness of the single lens becomes thin, on-axis thickness occupied by the lens unit can be reduced. Therefore, it is easy to reduce the total lens length during retraction.

Also, in each exemplary embodiment, the first lens unit L1 moves during zooming. Therefore, when considering the load to the actuator that drives the first lens unit L1, it is desirable that the on-axis thickness of the heavy lens unit having a large lens outside diameter is maximally thin. If a material exceeding the lower limit of the condition (2) is used, it is difficult to reduce the thickness of the single lens. On the other hand, since a glass material exceeding the upper limit of the condition (2) generally has a large dispersion, it is difficult to correct chromatic aberration. The numerical ranges of the conditions (1) and (2) can also be set as follows:

$$0.007 < d_{12}/fw < 0.045 \qquad (1a)$$

$$1.69 < Np < 1.95 \qquad (2a)$$

By satisfying these conditions, it is easy to suppress aberrations over the entire zoom area, while achieving a wider angle of view or higher compactness than in conventional zoom lenses.

In each exemplary embodiment, the zoom lens may also satisfy one or more of the following conditions (3) through (8). An on-axis distance from the lens surface of the first lens unit L1 closest to the object side to the lens surface of the first lens unit L1 closest to the image side is denoted by T1. A distance between the second lens and the third lens is denoted by $d_{23}$. An amount of movement of the first lens unit L1 in a direction of the optical axis (a difference between a position of the first lens unit L1 at the wide-angle end and a position of the first lens unit L1 at the telephoto end) during zooming from the wide-angle end to the telephoto end is denoted by m1. Regarding the sign of the amount of movement, a movement to the image side at the telephoto end rather than the wide-angle end is defined as positive, and a movement to the object side is defined as negative.

A focal length of the entire zoom lens at the telephoto end is denoted by ft. The aperture stop SP is located on the image side of the third lens unit L3. In this case, a distance between the aperture stop SP and the image plane at the wide-angle end is dented by Ds. A distance between the second lens unit L2 and the third lens unit L3 at the telephoto end is denoted by $D_{23}t$. Refractive power of an air lens formed by the first lens and the second lens is denoted by $f_{air}$.

In this case, it is desirable to satisfy one or more of the following conditions:

$$0.3 < T1/fw < 1.0 \qquad (3)$$

$$0.7 < d_{12}/d_{23} < 10.0 \qquad (4)$$

$$-0.5 < m1/ft < -0.2 \qquad (5)$$

$$1.0 < Ds/fw < 2.0 \qquad (6)$$

$$0.006 < D_{23}t/ft < 0.030 \qquad (7)$$

$$-9000 < f_{air}/d_{12} < -150 \qquad (8)$$

The technical significance of the above conditions will be described below.

The condition (3) defines the ratio of the on-axis thickness of the first lens unit L1 to the focal length of the entire zoom lens at the wide-angle end. If the lower limit of the condition (3) is exceeded, the number of the lenses available in the first lens unit L1 is reduced. Therefore, satisfactory aberration correction is difficult. Also, it is difficult to increase the photographic angle of view at the wide-angle end. Also, if the upper limit of the condition (3) is exceeded, it is difficult to fold the zoom lens during the reaction of the lens barrel. Therefore, it is difficult to make the zoom lens compact.

The condition (4) defines the ratio of the distance between the first lens and the second lens to the distance between the second lens and the third lens in the first lens unit L1. If the lower limit of the condition (4) is exceeded, the refractive power of the air lens configured by the first lens having negative refractive power and the second lens having positive refractive power becomes low. Therefore, in particular, it is difficult to achieve a wide angle of view while appropriately maintaining an amount of curvature of field. If the upper limit of the condition (4) is exceeded and thus the distance between the first lens having negative refractive power and the second lens having positive refractive power becomes long, the outside diameter of the first lens having negative refractive power is increased, and the outside diameter of the lens barrel is increased.

The condition (5) defines the ratio of a variation amount of the first lens unit L1 to the focal length of the entire zoom lens at the telephoto end during zooming from the wide-angle end to the telephoto end. If the lower limit of the condition (5) is exceeded, the amount of movement of the first lens unit L1 is lack. Therefore, it is necessary to increase the variable magnification contribution of the second lens group L2, which is the principal variable magnification lens unit. If doing so, it is difficult to correct aberrations over the entire zoom range. If the upper limit of the condition (5) is exceeded, the amount of movement of the first lens unit L1 becomes too large. Therefore, in order to shorten the entire lens barrel length during retraction, it is required to provide a configuration that makes the number of stages of the retraction into multiple stages. As a result, the lens barrel is complicated, and the diameter of the lens barrel is increased.

The condition (6) defines the position of the aperture stop SP at the entire zoom lens. The condition (6) is provided for setting the aperture stop located on the image side of the third lens unit L3 to an appropriate distance with respect to the image plane, so as to downsize the fourth lens unit L4, which is the focus lens unit. If the condition (6) is not satisfied, it is difficult to downsize the fourth lens unit L4.

The condition (7) defines the distance between the second lens unit L2 and the third lens unit L3 at the telephoto end. If the lower limit of the condition (7) is exceeded, the second lens unit L2 and the third lens unit L3 may interfere with each other. Also, if the upper limit of the condition (7) is exceeded, the first lens unit L1 is too far apart with respect to the aperture stop SP disposed on the image side of the third lens unit L3. Therefore, the effective diameter of the front lens is increased. Also, a sufficient zoom ratio cannot be secure.

The condition (8) defines the effect of the air lens within the first lens unit L1. The air lens has negative refractive power and is effective in terms of a wide angle of view. However, if the refractive power of the air lens becomes too high beyond the upper limit of the condition (8), curvature of field is increased. Also, if the lower limit of the condition (8) is exceeded, the negative refractive power becomes insufficient. The load of the first lens having negative refractive power is increased, and various aberrations are increased.

Also, in each exemplary embodiment, in order to appropriately perform the aberration correction, reduce the aberration variation during zooming, and obtain a high zoom ratio, the numerical ranges of the conditions (3) to (8) can also be set as follows:

$$0.4 < T1/fw < 0.7 \quad (3a)$$

$$0.75 < d_{12}/d_{23} < 8.00 \quad (4a)$$

$$-0.40 < m1/ft < -0.25 \quad (5a)$$

$$1.3 < Ds/fw < 1.8 \quad (6a)$$

$$0.010 < D_{23}t/ft < 0.025 \quad (7a)$$

$$-6000 < f_{air}/d_{12} < -200 \quad (8a)$$

According to each exemplary embodiment, by appropriately setting the amount of movement of each lens unit during zooming and the refractive power of each lens unit, it is easy to downsize the total lens length, regardless of the wide angle of view and the high zoom ratio. Also, it is possible to obtain the zoom lens having superior optical performance over the entire zoom range from the wide-angle end to the telephoto end.

Next, the lens configuration of the zoom lens will be described. Since the effective lens diameter of the first lens unit L1 tends to be large, it is desirable for the downsizing of the entire zoom lens when the number of the lenses is small. In each exemplary embodiment, the first lens unit L1 includes a first lens having negative refractive power, a second lens having positive refractive power, and a third lens having positive refractive power. In this manner, spherical aberration and chromatic aberration caused by a high zoom ratio are suppressed.

The second lens unit L2 includes three independent lenses, including a meniscus-shaped negative lens having a surface convex toward the object side, a negative lens, whose both lens surfaces are concave, and a positive lens having a surface convex toward the object side. Therefore, an aberration variation during zooming is reduced. In particular, distortion aberration at the wide-angle end or spherical aberration at the telephoto end is excellently corrected. The third lens L3 includes a positive lens, a cemented lens in which a positive lens and a negative lens having a surface concave toward the image side are cemented to each other, and a positive lens. A principal point distance between the second lens unit L2 and the third lens unit L3 is reduced. Therefore, the lens length after the third lens unit L3 is shortened.

Also, the third lens unit L3 includes one or more aspheric surfaces. Therefore, an aberration variation according to zooming is excellently corrected. Also, by using the cemented lens, a variation in chromatic aberration during zooming is suppressed. In addition, the third lens unit L3 is movable to be eccentric (decentered) with respect to the optical axis. Therefore, when an operation of correcting an image shake is performed, the occurrence of the aberrations due to the decentering is reduced. The fourth lens unit L4 includes a positive lens having an aspheric surface as the image-side surface. Therefore, the fourth lens unit L4 is lightweight and suppresses a variation in chromatic aberration.

By configuring each lens unit as described above, it is possible to achieve the compact zoom lens having a wide photographing angle of view at the wide-angle end and a high zoom ratio.

Next, an exemplary embodiment of a digital camera (image pickup apparatus), in which the zoom lens according to the exemplary embodiment is used as a photographic optical system, will be described with reference to FIG. 9. In FIG. 9, the digital camera includes a camera body 90, and a photographic optical system 91 configured by the zoom lens of each exemplary embodiment described above. An image sensor (solid-state image sensor) 92, such as a charge-coupled device (CCD) sensor, optically receives an object image formed by the photographic optical system 91.

In the exemplary embodiment, an image recording area of the image sensor 92 differs between the wide-angle end and the telephoto end. Specifically, the image recording area increases at the telephoto end. Therefore, optical performance balance of the entire screen is excellently maintained. A recording unit 93 records the object image optically received by the image sensor 92. A viewfinder 94 allows a user to observe the object image displayed on a display device (not illustrated). The display device includes a liquid crystal panel and displays the object image formed on the image pickup element 92. By applying the zoom lens according to each exemplary embodiment of the present invention to the image pickup apparatus such as the digital camera, the present invention can realize a small-size image pickup apparatus having high optical performance.

The zoom lens according to each exemplary embodiment of the present invention can also be equally applied to a mirrorless single-lens reflex camera having no quick-return mirror.

Next, numerical examples 1 to 4 respectively corresponding to the first to fourth embodiments of the present invention will be described. In each numerical example, i denotes an order of a surface from an object side, ri denotes a radius of curvature of an i-th surface (i-th surface), di denotes a distance between an i-th surface and an (i+1)th surface, ndi and vdi respectively denote refractive index and Abbe number of a material of an i-th optical member with respect to d-line. Also, in the first to fourth numerical examples, two surfaces closest to the image side are flat surfaces corresponding to an optical block. X denotes a displacement in a direction of an optical axis at a position of a height H from an optical axis. A light traveling direction is set as positive, R denotes a paraxial radius of curvature, K denotes a conic constant, and A4, A6, A8, and A10 are aspheric coefficients. The aspheric surface shape X is expressed as:

$$X = \frac{H^2/R}{1 + \sqrt{1 - (1+k)(H/R)^2}} + A4H^4 + A6H^6 + A8H^8 + A10H^{10}$$

* denotes a surface having an aspheric surface shape. The expression "e-x" represents "×10⁻ˣ". A back focus (BF) is represented by an air conversion of a distance from the last surface to the image plane. The relation between numerical numbers in each condition and each numerical example is given in Table 1 below.

NUMERICAL EXAMPLE 1

Unit: mm
Surface Data

| Surface Number | r | d | nd | Nd |
|---|---|---|---|---|
| 1 | 218.267 | 1.70 | 1.84666 | 23.9 |
| 2 | 78.618 | 0.34 | | |
| 3 | 91.879 | 2.40 | 1.69680 | 55.5 |

-continued

| | | | | |
|---|---|---|---|---|
| 4 | 695.796 | 0.15 | | |
| 5 | 45.705 | 2.80 | 1.77250 | 49.6 |
| 6 | 240.673 | (Variable) | | |
| 7* | 500.720 | 1.30 | 1.85135 | 40.1 |
| 8* | 14.331 | 5.29 | | |
| 9 | −74.641 | 1.00 | 1.77250 | 49.6 |
| 10 | 54.944 | 0.15 | | |
| 11 | 22.877 | 2.20 | 1.92286 | 18.9 |
| 12 | 66.178 | (Variable) | | |
| 13* | 14.293 | 2.45 | 1.84954 | 40.1 |
| 14* | 195.351 | 0.15 | | |
| 15 | 11.741 | 3.70 | 1.77250 | 49.6 |
| 16 | −100.967 | 0.50 | 1.80518 | 25.4 |
| 17 | 7.091 | 1.40 | | |
| 18 | −177.768 | 1.70 | 1.48749 | 70.2 |
| 19 | −30.778 | 1.00 | | |
| 20 | ∞ | (Variable) | | (Stop) |
| 21 | ∞ | (Variable) | | (flare cut Stop) |
| 22 | 428.830 | 4.40 | 1.69350 | 53.2 |
| 23* | −34.989 | (Variable) | | |
| 24 | ∞ | 1.56 | 1.51633 | 64.1 |
| 25 | ∞ | 1.78 | | |
| Image Plane | ∞ | | | |

Aspheric Surface Data

Seventh Surface $K = -8.84556e+003$   $A4 = 8.00299e-006$   $A6 = -3.16834e-008$
$A8 = -5.90488e-011$ Eighth Surface $K = 2.32817e-001$   $A4 = -3.41924e-006$   $A6 = 1.27878e-007$
$A8 = -1.02659e-009$   $A10 = 1.45962e-012$ Thirteenth Surface $K = -2.85206e-004$   $A4 = -2.69579e-005$   $A6 = -2.39976e-007$
$A8 = 5.11410e-009$   $A10 = -6.28897e-011$ Fourteenth Surface $K = -3.28791e+002$   $A4 = 8.60496e-006$   $A6 = -8.10877e-008$
$A8 = 7.39234e-010$ Twenty Third Surface $K = -1.09602e+000$   $A4 = -1.03709e-005$   $A6 = -4.05485e-008$
$A8 = 3.58272e-010$   $A10 = -7.41890e-013$ Various Data
Zoom Ratio 3.83

| | Wide-Angle | Middle | Telephoto |
|---|---|---|---|
| Focal Length | 15.40 | 29.40 | 58.99 |
| F-number | 2.88 | 4.58 | 5.94 |
| Half Angle of View | 33.87 | 21.48 | 11.26 |
| Image Height | 10.34 | 11.57 | 11.75 |
| Total Lens Length | 74.48 | 76.73 | 94.27 |
| BF | 8.21 | 7.80 | 7.81 |
| d6 | 1.10 | 4.57 | 18.67 |
| d12 | 20.81 | 8.26 | 0.73 |
| d20 | 0.50 | 2.79 | 0.81 |
| d21 | 11.23 | 20.69 | 33.63 |
| d23 | 5.41 | 4.99 | 5.01 |

Zoom Lens Unit Data

| Unit | Starting Surface | Focal Length |
|---|---|---|
| 1 | 1 | 74.24 |
| 2 | 7 | −18.26 |
| 3 | 13 | 20.21 |
| 4 | 21 | ∞ |

-continued

| | | |
|---|---|---|
| 5 | 22 | 46.83 |
| 6 | 24 | ∞ |

NUMERICAL EXAMPLE 2

Unit: mm
Surface Data

| Surface Number | r | d | nd | νd |
|---|---|---|---|---|
| 1 | 194.535 | 1.70 | 1.84666 | 23.9 |
| 2 | 67.437 | 0.47 | | |
| 3 | 84.543 | 2.30 | 1.77250 | 49.6 |
| 4 | 942.123 | 0.15 | | |
| 5 | 43.809 | 2.80 | 1.77250 | 49.6 |
| 6 | 270.300 | (Variable) | | |
| 7* | 803.525 | 1.30 | 1.85135 | 40.1 |
| 8* | 14.766 | 5.84 | | |
| 9 | −51.416 | 1.00 | 1.69680 | 55.5 |
| 10 | 61.434 | 0.15 | | |
| 11 | 23.892 | 2.19 | 1.94595 | 18.0 |
| 12 | 59.994 | (Variable) | | |
| 13* | 14.288 | 2.45 | 1.84954 | 40.1 |
| 14* | 167.988 | 0.15 | | |
| 15 | 11.505 | 3.50 | 1.77250 | 49.6 |
| 16 | −158.407 | 0.50 | 1.80518 | 25.4 |
| 17 | 7.102 | 1.66 | | |
| 18 | −787.928 | 1.50 | 1.48749 | 70.2 |
| 19 | −37.140 | 1.00 | | |
| 20 | ∞ | (Variable) | | (Stop) |
| 21 | ∞ | (Variable) | | (flare cut stop) |
| 22 | 149.305 | 4.40 | 1.58313 | 59.4 |
| 23* | −32.679 | (Variable) | | |
| 24 | ∞ | 1.60 | 1.51633 | 64.1 |
| 25 | ∞ | 1.60 | | |
| Image Plane | ∞ | | | |

Aspheric Surface Data

Seventh Surface

K = − 3.55520e+003    A4 = 3.96781e−006    A6 = − 7.61401e−009
Eighth Surface

K = 1.85296e−001    A4 = 2.96876e−006    A6 = 9.37786e−008
A8 = − 5.50190e−010    A10 = 3.59100e−012
Thirteenth Surface K = − 4.35412e−001    A4 = − 5.94557e−006    A6 = 1.25897e−007
A8 = − 6.81003e−010    A10 = 6.15497e−011
Fourteenth Surface K = 1.10502e+002    A4 = 4.76420e−006    A6 = − 1.87289e−008
A8 = 4.49787e−009
Twenty Third Surface K = 1.42856e+000    A4 = 1.36245e−006    A6 = − 1.07968e−007
A8 = 9.40144e−010    A10 = − 2.01915e−012

Various Data
Zoom Ratio 3.82

| | Wide-Angle | Middle | Telephoto |
|---|---|---|---|
| Focal Length | 15.43 | 29.20 | 59.00 |
| F-number | 2.88 | 4.57 | 5.94 |
| Half Angle of View | 33.82 | 21.61 | 11.26 |
| Image Height | 10.34 | 11.57 | 11.75 |
| Total Lens Length | 74.58 | 78.97 | 94.64 |

-continued

| | | | |
|---|---|---|---|
| BF | 9.42 | 7.58 | 7.87 |
| d6 | 0.95 | 5.27 | 15.95 |
| d12 | 20.14 | 9.22 | 1.20 |
| d20 | 0.50 | 2.40 | 0.03 |
| d21 | 10.50 | 21.44 | 36.52 |
| d23 | 6.77 | 4.92 | 5.22 |

Zoom Lens Unit Data

| Unit | Starting Surface | Focal Length |
|---|---|---|
| 1 | 1 | 66.67 |
| 2 | 7 | −17.32 |
| 3 | 13 | 20.49 |
| 4 | 21 | ∞ |
| 5 | 22 | 46.39 |
| 6 | 24 | ∞ |

NUMERICAL EXAMPLE 3

Unit: mm
Surface Data

| Surface Number | r | d | nd | vd |
|---|---|---|---|---|
| 1 | 300.187 | 1.70 | 1.84666 | 23.9 |
| 2 | 82.000 | 0.12 | | |
| 3 | 87.000 | 2.80 | 1.77250 | 49.6 |
| 4 | −566.162 | 0.15 | | |
| 5 | 48.774 | 2.40 | 1.77250 | 49.6 |
| 6 | 167.526 | (Variable) | | |
| 7* | 537.928 | 1.30 | 1.84954 | 40.1 |
| 8* | 15.093 | 5.39 | | |
| 9 | −48.852 | 0.90 | 1.69680 | 55.5 |
| 10 | 72.771 | 0.15 | | |
| 11 | 23.669 | 2.20 | 1.94595 | 18.0 |
| 12 | 54.870 | (Variable) | | |
| 13* | 14.287 | 2.60 | 1.84954 | 40.1 |
| 14* | 140.012 | 0.15 | | |
| 15 | 11.926 | 3.60 | 1.77250 | 49.6 |
| 16 | −157.866 | 0.50 | 1.80518 | 25.5 |
| 17 | 7.261 | 1.60 | | |
| 18 | −233.033 | 1.70 | 1.59282 | 68.6 |
| 19 | −32.336 | 1.07 | | |
| 20 | ∞ | (Variable) | | (Stop) |
| 21 | ∞ | (Variable) | | (flare cut stop) |
| 22 | 962.619 | 4.40 | 1.69350 | 53.2 |
| 23* | −35.905 | (Variable) | | |
| 24 | ∞ | 3.25 | 1.51633 | 64.1 |
| 25 | ∞ | 2.28 | | |
| Image Plane | ∞ | | | |

Aspheric Surface Data

Seventh Surface

K = −1.96712e+003  A4 = 1.56634e−006  A6 = −2.85082e−009
Eighth Surface

K = 4.39249e−002  A4 = 6.18877e−006  A6 = 1.10403e−007
A8 = −5.35382e−010  A10 = 5.77480e−012
Thirteenth Surface K = −7.84128e−001  A4 = 8.48751e−006  A6 = −3.57373e−007
A8 = 7.93069e−009  A10 = −2.03928e−010
Fourteenth Surface K = −1.97472e+002  A4 = 1.20159e−005  A6 = −1.42408e−007
A8 = −7.66982e−009

-continued

Twenty Third Surface

| K = − 2.36065e+000 | A4 = − 1.42384e−005 | A6 = − 1.05254e−007 |
| A8 = 9.12861e−010 | A10 = − 2.34000e−012 | |

Various Data
Zoom Ratio 3.81

|  | Wide-Angle | Middle | Telephoto |
| --- | --- | --- | --- |
| Focal Length | 15.64 | 30.65 | 59.57 |
| F-number | 2.88 | 4.58 | 5.94 |
| Half Angle of View | 33.46 | 20.68 | 11.16 |
| Image Height | 10.34 | 11.57 | 11.75 |
| Total Lens Length | 74.05 | 78.87 | 94.16 |
| BF | 9.83 | 11.15 | 9.42 |
| d6 | 1.00 | 7.62 | 19.81 |
| d12 | 20.08 | 7.49 | 0.70 |
| d20 | 0.50 | 5.63 | 1.18 |
| d21 | 9.92 | 14.25 | 30.32 |
| d23 | 5.41 | 6.73 | 5.00 |
| d25 | 2.28 | 2.28 | 2.28 |

Zoom Lens Unit Data

| Unit | Starting Surface | Focal Length |
| --- | --- | --- |
| 1 | 1 | 71.23 |
| 2 | 7 | −17.89 |
| 3 | 13 | 20.34 |
| 4 | 21 | ∞ |
| 5 | 22 | 50.00 |
| 6 | 24 | ∞ |

NUMERICAL EXAMPLE 4

Unit: mm
Surface Data

| Surface Number | r | D | nd | vd |
| --- | --- | --- | --- | --- |
| 1 | 257.708 | 1.70 | 1.84666 | 23.9 |
| 2 | 78.524 | 0.42 | | |
| 3 | 100.224 | 2.30 | 1.69680 | 55.5 |
| 4 | −1848.888 | 0.15 | | |
| 5 | 45.061 | 2.90 | 1.77250 | 49.6 |
| 6 | 253.867 | (Variable) | | |
| 7* | 426.612 | 1.30 | 1.85135 | 40.1 |
| 8* | 14.644 | 5.29 | | |
| 9 | −67.927 | 1.00 | 1.77250 | 49.6 |
| 10 | 54.445 | 0.15 | | |
| 11 | 22.994 | 2.55 | 1.92286 | 18.9 |
| 12 | 67.427 | (Variable) | | |
| 13* | 14.237 | 2.60 | 1.84954 | 40.1 |
| 14* | 182.280 | 0.15 | | |
| 15 | 10.892 | 3.00 | 1.77250 | 49.6 |
| 16 | 307.386 | 0.60 | 1.80518 | 25.4 |
| 17 | 6.914 | 1.75 | | |
| 18 | −427.643 | 1.70 | 1.48749 | 70.2 |
| 19 | −40.597 | 1.00 | | |
| 20 (Stop) | ∞ | (Variable) | | |
| 21 | 515.350 | 4.40 | 1.58313 | 59.4 |
| 22* | −27.443 | (Variable) | | |
| 23 | ∞ | 1.56 | 1.51633 | 64.1 |
| 24 | ∞ | 1.56 | | |
| Image Plane | ∞ | | | |

-continued

Aspheric Surface Data

Seventh Surface

K = − 9.92306e+003    A4 = 5.32644e−006    A6 = − 2.24579e−008
A8 = 5.90488e−011
Eighth Surface K = 1.87034e−001    A4 = − 8.10318e−006    A6 = 2.62959e−007
A8 = − 2.74956−e009    A10 = 1.36190e−011
Thirteenth Surface K = − 2.29599e−001    A4 = − 2.19651e−005    A6 = − 1.60274e−007
A8 = 8.38039e−010    A10 = − 1.30242e−010
Fourteenth Surface K = 4.80661e+001    A4 = − 7.13403e−006    A6 = − 3.77287e−008
A8 = − 5.23381e−009    A10 = − 4.54059e−011
Twenty Second Surface K = − 7.99912e+000    A4 = − 4.30088e−005    A6 = 5.11595e−008
A8 = 4.13624e−010    A10 = − 1.51765e−012

Various Data
Zoom Ratio 3.79

| | Wide-Angle | Middle | Telephoto |
|---|---|---|---|
| Focal Length | 15.57 | 30.33 | 58.93 |
| F-number | 2.88 | 4.58 | 5.94 |
| Half Angle of View | 33.60 | 20.88 | 11.28 |
| Image Height | 10.34 | 11.57 | 11.75 |
| Total Lens Length | 74.82 | 79.54 | 94.40 |
| BF | 9.41 | 7.95 | 7.58 |
| d6 | 1.00 | 6.55 | 17.05 |
| d12 | 20.46 | 8.58 | 0.90 |
| d20 | 11.00 | 23.50 | 35.91 |
| d22 | 6.82 | 5.36 | 5.00 |

Zoom Lens Unit Data

| Unit | Starting Surface | Focal Length |
|---|---|---|
| 1 | 1 | 71.11 |
| 2 | 7 | −18.28 |
| 3 | 13 | 20.73 |
| 4 | 21 | 44.82 |
| 5 | 23 | ∞ |

TABLE 1

| | Condition | Example 1 | Example 2 | Example 3 | Example 4 |
|---|---|---|---|---|---|
| (1) | $d_{12}/fw$ | 0.02 | 0.03 | 0.01 | 0.04 |
| (2) | $Np$ | 1.697 | 1.773 | 1.773 | 1.697 |
| (3) | $T1/fw$ | 0.48 | 0.48 | 0.46 | 0.50 |
| (4) | $d_{12}/d_{23}$ | 2.27 | 3.13 | 0.80 | 4.67 |
| (5) | $m1/ft$ | −0.34 | −0.34 | −0.34 | −0.34 |
| (6) | $Ds/fw$ | 1.58 | 1.64 | 1.58 | 1.61 |
| (7) | $D_{23}t/ft$ | 0.012 | 0.020 | 0.012 | 0.015 |
| (8) | $f_{air}/d_{12}$ | −931.46 | −632.56 | −5840.70 | −305.92 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-001061 filed Jan. 6, 2012, which is hereby incorporated by reference herein in its entirety.

What is claimed is:

1. A zoom lens comprising, in order from an object side to an image side:
   a first lens unit having positive refractive power;
   a second lens unit having negative refractive power;
   a third lens unit having positive refractive power; and
   a fourth lens unit having positive refractive power,
   wherein, during zooming from a wide-angle end to a telephoto end, the first lens unit moves with a locus convex toward the image side, and the third lens unit moves toward the object side,
   wherein the first lens unit includes, in order from the object side to the image side, a first lens having negative refractive power, a second lens having positive refractive power, and a third lens having positive refractive power, and wherein the following conditions are satisfied:

$$0.005 < d_{12}/fw < 0.050$$

$$1.67 < Np < 2.02$$

where $d_{12}$ is a distance between the first lens and the second lens, fw is a focal length of the entire zoom lens at the wide-angle end, and Np is the refractive index of a positive lens having the lowest refractive index among the refractive indices of materials of all positive lenses included in the first lens unit.

2. The zoom lens according to claim 1, wherein the following condition is satisfied:

$$0.3 < T1/fw < 1.0$$

where T1 is an on-axis distance from a lens surface of the first lens unit closest to the object side to a lens surface of the first lens unit closest to the image side.

3. The zoom lens according to claim 1, wherein the following condition is satisfied:

$$0.7 < d_{12}/d_{23} < 10.0$$

where $d_{23}$ is a distance between the second lens and the third lens.

4. The zoom lens according to claim 1, wherein the following condition is satisfied:

$$-0.5 < m1/ft < -0.2$$

where m1 is an amount of movement of the first lens unit in a direction of the optical axis during zooming from the wide-angle end to the telephoto end, and ft is a focal length of the entire zoom lens at the telephoto end.

5. The zoom lens according to claim 1, further comprising an aperture stop located on the image side of the third lens unit.

6. The zoom lens according to claim 1, further comprising an aperture stop located on the image side of the third lens unit, and
wherein the following condition is satisfied:

$$1.0 < Ds/fw < 2.0$$

where Ds is a distance between the aperture stop and an image plane at the wide-angle end.

7. The zoom lens according to claim 1, wherein the following condition is satisfied:

$$0.006 < D_{23}t/ft < 0.030$$

where ft is a focal length of the entire zoom lens at the telephoto end, and $D_{23}t$ is a distance between the second lens unit and the third lens unit at the telephoto end.

8. The zoom lens according to claim 1, wherein the following condition is satisfied:

$$-9000 < f_{air}/d_{12} < -150$$

where $f_{air}$ is the refractive power of an air lens formed by the first lens and the second lens.

9. An image pickup apparatus comprising:
a zoom lens; and
a solid-state image sensor configured to receive an image formed by the zoom lens,
wherein the zoom lens comprises, in order from an object side to an image side:
a first lens unit having positive refractive power;
a second lens unit having negative refractive power;
a third lens unit having positive refractive power; and
a fourth lens unit having positive refractive power,
wherein, during zooming from a wide-angle end to a telephoto end, the first lens unit moves with a locus convex toward the image side, and the third lens unit moves toward the object side,
wherein the first lens unit includes, in order from the object side to the image side, a first lens having negative refractive power, a second lens having positive refractive power, and a third lens having positive refractive power, and
wherein the following conditions are satisfied:

$$0.005 < d_{12}/fw < 0.050$$

$$1.67 < Np < 2.02$$

where $d_{12}$ is a distance between the first lens and the second lens, fw is a focal length of the entire zoom lens at the wide-angle end, and Np is the refractive index of a positive lens having the lowest refractive index among the refractive indices of materials of all positive lenses included in the first lens unit.

10. The image pickup apparatus according to claim 9, wherein an image recording area formed on the solid-state image sensor differs between the wide-angle end and the telephoto end.

* * * * *